(12) United States Patent
Okada et al.

(10) Patent No.: US 7,773,824 B2
(45) Date of Patent: *Aug. 10, 2010

(54) SIGNAL PROCESSING DEVICE AND METHOD, RECORDING MEDIUM, AND PROGRAM

(75) Inventors: Shintaro Okada, Toyko (JP); Kazuhiko Ueda, Kanagawa (JP); Mitsuyasu Asano, Tokyo (JP); Takeshi Kubozono, Kanagawa (JP); Kazuki Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 560 days.

This patent is subject to a terminal disclaimer.

(21) Appl. No.: 10/553,085

(22) PCT Filed: Apr. 19, 2004

(86) PCT No.: PCT/JP2004/005559
§ 371 (c)(1),
(2), (4) Date: Oct. 11, 2005

(87) PCT Pub. No.: WO2004/097738
PCT Pub. Date: Nov. 11, 2004

(65) Prior Publication Data
US 2006/0215927 A1 Sep. 28, 2006

(30) Foreign Application Priority Data
Apr. 25, 2003 (JP) .............................. 2003-121086

(51) Int. Cl.
*G06K 9/40* (2006.01)
(52) U.S. Cl. ....................... 382/274; 345/617; 348/251; 358/461
(58) Field of Classification Search ................. 382/100, 382/162, 167, 254, 255, 260–266, 274, 275; 345/20, 63, 77, 581–618, 690–697; 348/251, 348/254; 358/461
See application file for complete search history.

(56) References Cited

U.S. PATENT DOCUMENTS

2001/0038716 A1* 11/2001 Tsuchiya et al. ............ 382/261

(Continued)

FOREIGN PATENT DOCUMENTS

EP 1 137 258 9/2001

(Continued)

OTHER PUBLICATIONS

Hiroaki Watabe et al.; Nonlinear Filters for Multimedia Applications; Image Processing Proceedings 1999 I.

(Continued)

*Primary Examiner*—Anand Bhatnagar
(74) *Attorney, Agent, or Firm*—Sonnenschein Nath & Rosenthal LLP

(57) ABSTRACT

The present invention relates to a signal processing apparatus and a method, a recording medium, and a program, in which portions except an edge can be smoothed while the edge whose change in pixel value is steep is held correctly. A pixel of attention is determined in step S11, and a neighboring pixel is determined in step S12. In step S13, a difference in pixel values between the pixel of attention and each neighboring pixel is calculated. In step S14, according to a relationship in size between the difference and a threshold value ε., flags are raised for the neighboring pixel and a neighboring pixel which are symmetrical. Furthermore, a flag is also raised for a neighboring pixel away from, in view of the pixel of attention, the symmetrical neighboring pixel for which the flag is raised. In step S15, 7-pixel taps centered around the pixel of attention are averaged by weight. However, with respect to the neighboring pixel for which the flag is raised, the pixel value is replaced by that of the pixel of attention C, and is calculated. The present invention can be applied to a video camera, a television receiver, etc.

4 Claims, 13 Drawing Sheets

U.S. PATENT DOCUMENTS

| | | |
|---|---|---|
| 2002/0047911 A1 | 4/2002 | Tsuchiya et al. |
| 2003/0156761 A1 | 8/2003 | Ogata et al. |
| 2004/0008902 A1 * | 1/2004 | Nakajima et al. ........... 382/260 |

FOREIGN PATENT DOCUMENTS

| | | |
|---|---|---|
| EP | 1 291 821 | 3/2003 |
| JP | 2001-118064 | 4/2001 |
| JP | 2001-275015 | 10/2001 |
| JP | 2001-298621 | 10/2001 |
| JP | 2002-259962 | 9/2002 |
| JP | 2003-8935 | 1/2003 |
| WO | WO 02/69263 | 2/2002 |
| WO | WO 03/001793 | 6/2002 |

OTHER PUBLICATIONS

M Ogata et al.; Dynamic Range Compression Based on Illumination Compensation; IEEE Transactions on Consumer Electronics, IEEE Service Center, New York, NY; vol. 47, No. 3, Aug. 2001.

International Search Report dated Mar. 23, 2007.

* cited by examiner

FIG. 2A
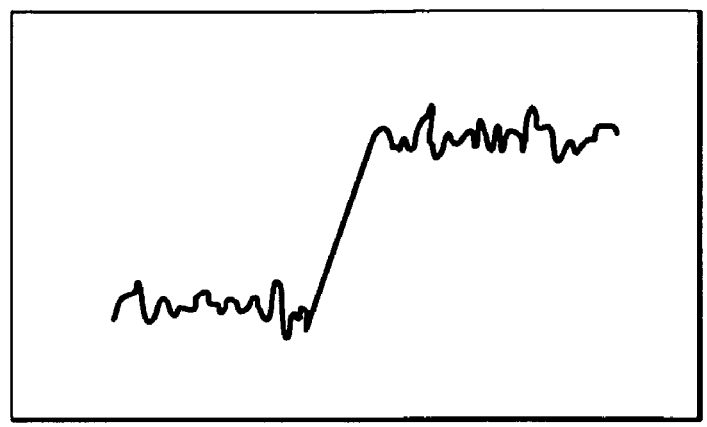
FIG. 2B
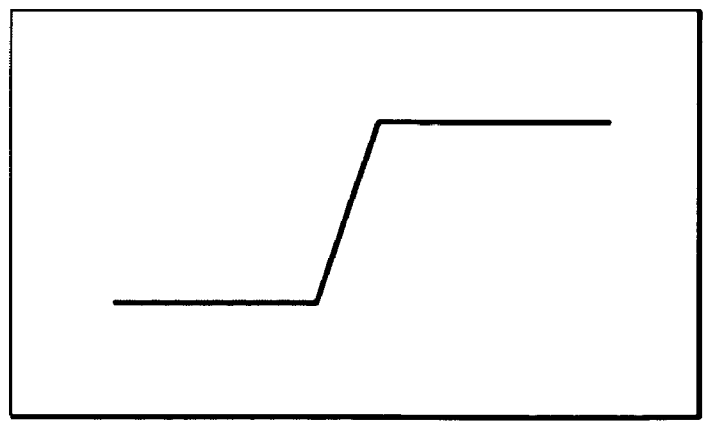
FIG. 3
(L2) (L1) (C) (R1) (R2)

SIGNAL PROCESSING DEVICE AND METHOD, RECORDING MEDIUM, AND PROGRAM

TECHNICAL FIELD

The present invention relates to a signal processing apparatus and a method, a recording medium, and a program, more particularly to a signal processing apparatus and a method, a recording medium, and a program which can be suitably used when emphasizing a texture of the inside surrounded by edges without emphasizing the edges too much in an image, for example.

BACKGROUND ART

Conventionally, as for the video camera, a contrast emphasis method by way of gradation change, a high frequency component emphasis method of emphasizing contrast of a high frequency component in an image, etc. have been proposed as a method of improving contrast (a difference between brightness and darkness) and a degree of sharpness (bordering precision) of an image taken by imaging devices, such as CCD (Charge Coupled Device), CMOS (Complementary Metal-Oxide Semiconductor), etc.

As the contrast emphasis method, a tone curve adjustment in which a pixel level for each pixel of an image is converted with a function (hereafter referred to as a level conversion function) having a predetermined input-and-output relationship, and a method referred to as histogram equalization in which the level conversion function is adaptively changed according to frequency distribution of pixel levels have been proposed.

As the high frequency component emphasis method, a method referred to as an unsharp mask has been proposed that performs a so-called edge enhancement in which an edge is extracted from the image and the extracted edge is emphasized.

In the contrast emphasis method, however, there is a problem in that only some bright regions within all the dynamic range (a difference between the maximum level and the minimum level) of the image can be increased in contrast. In addition, there is another problem in that the contrast is instead reduced in the brightest part and the darkest part of an image in the case of the tone curve adjustment, and near a luminescence region with low frequency distribution in the case of the histogram equalization. Furthermore, in the high frequency component emphasis method there is another problem in that only the contrast of the high frequency component of the image is emphasized, whereby the portion near the edges of the image is unnaturally emphasized, and deterioration of image quality is unavoidable.

Then, there is a conventional method in which, in a situation where edges having a steep change in a pixel value among input image data are saved, portions other than the edges are amplified with an image signal processing apparatus constructed as shown in FIG. 1, to thereby emphasize the portions other than the edges (for example, Japanese Patent Application Publication (KOKAI) No. 2001-298621).

In the image signal processing apparatus as shown in FIG. 1, an inputted image signal is inputted into an $\epsilon$ filter 1 and a subtraction unit 2. The $\epsilon$ filter 1 receives, as an input, an image signal slightly changing on both sides of a steep edge as shown in FIG. 2A, converts it into an image signal in which only edges as shown in FIG. 2B are extracted, and which is outputted to the subtraction unit 2 and an adder 4.

Particular processing of the $\epsilon$ filter 1 will be described with reference to FIGS. 3 and 4. The $\epsilon$ filter 1 determines each pixel of the input image to be a pixel of attention C one by one. As shown in FIG. 3, taps are set up, including a plurality of neighbouring pixels (in this case six pixels L3, L2, L1, R1, R2, R3) which are horizontally successive and centered around the pixel of attention C. As shown in the following expression (1), pixel values of the pixel of attention C and the plurality of neighbouring pixels are subjected to weighted averaging by means of the tap coefficients (for example, {1, 2, 3, 4, 3, 2, 1}), and outputted as a conversion result C' corresponding to the pixel of attention C.

$$C' = (1 \cdot L3 + 2 \cdot L2 + 3 \cdot L1 + 4C + 3 \cdot R1 + 2 \cdot R2 + 1 \cdot R3)/16 \quad (1)$$

However, as shown in FIG. 4, a neighbouring pixel (in the case of FIG. 4, neighbouring pixels R2 and R3) having a difference, which is larger than a predetermined threshold value $\epsilon$, between its pixel value and the pixel of attention C is calculated by replacing it by that of the pixel of attention C. That is, in the case of FIG. 4, the following expression (2) is calculated.

$$C' = (1 \cdot L3 + 2 \cdot L2 + 3 \cdot L1 + 4 \cdot C + 3 \cdot R1 + 2 \cdot C + 1 \cdot C)/16 \quad (2)$$

Now, returning to FIG. 1, the subtraction unit 2 subtracts the image signal inputted from the $\epsilon$ filter 1, from the image signal (the same as the input to the $\epsilon$ filter 1) inputted from the preceding stage, extracts the image signal slightly changing other than that of the edge, and outputs it to an amplification unit 3. The amplification unit 3 amplifies the output of the subtraction unit 2, and outputs it to the adder 4. The adder 4 adds the image signal in which parts other than the edge outputted from the amplification unit 3 are amplified, to the image signal in which only the edge inputted from the $\epsilon$ filter 1 is extracted. This produced total is the image signal in which the parts other than the edge are amplified in the situation where the steep edge is held.

Incidentally, in the $\epsilon$ filter 1 of the image signal processing apparatus as shown in FIG. 1, when an image signal having a larger edge size than the predetermined threshold value $\epsilon$ is inputted as shown in FIG. 5 for example, the image signal after conversion is such that the phase is shifted to the left-hand side, as shown in FIG. 6. That is, there is a problem in that the edge with the steep change in pixel value is not held correctly, and an image quality may deteriorate.

DISCLOSURE OF THE INVENTION

The present invention is invented in view of such situations, and aims to smooth portions except an edge while the edge whose change in pixel value is steep is held correctly.

A signal processing apparatus of the present invention includes: designation means for designating continuously arranged signals as a signal of attention one by one; determination means for determining a predetermined number of signals preceding the signal of attention designated by the designation means, and a predetermined number of signals following the signal of attention, to be neighbouring signals; weight average means for averaging by weight the signal of attention and the plurality of neighbouring signals; flag setting means for calculating a difference in levels between the signal of attention and a neighbouring signal, judging whether or not the difference is larger than a predetermined threshold value, and raising flags for the neighbouring signal and a neighbouring signal which are arranged symmetrically with respect to the signal of attention, when the difference is judged to be larger than the predetermined threshold value; and control means for controlling and causing the weighted average means to average by weight, using the signal of attention instead of the neighbouring signal for which the flag is raised.

On the basis of the position of the signal of attention, the above-mentioned flag setting means can raise a flag also for the neighbouring signal arranged away from the neighbouring signal for which the flag has been raised.

The above-mentioned signal can be the pixel value of the pixel which constitutes the image.

A signal processing method of the present invention includes: a designation step of designating continuously arranged signals as a signal of attention one by one; a determination step of determining a predetermined number of signals preceding the signal of attention designated by way of the designation step, and a predetermined number of signals following the signal of attention, to be neighbouring signals; a weight average step of averaging by weight the signal of attention and the plurality of neighbouring signals; a flag setting step of calculating a difference in levels between the signal of attention and a neighbouring signal, judging whether or not the difference is larger than a predetermined threshold value, and raising flags for the neighbouring signal and a neighbouring signal which are arranged symmetrically with respect to the signal of attention, when the difference is judged to be larger than the predetermined threshold value; and a control step of controlling and causing a process in the weighted average step to average by weight, using the signal of attention instead of the neighbouring signal for which the flag is raised.

A program for a recording medium in accordance with the present invention includes: a designation step of designating continuously arranged signals as a signal of attention one by one; a determination step of determining a predetermined number of signals preceding the signal of attention designated by way of the designation step, and a predetermined number of signals following the signal of attention, to be neighbouring signals; a weight average step of averaging by weight the signal of attention and the plurality of neighbouring signals; a flag setting step of calculating a difference in levels between the signal of attention and a neighbouring signal, judging whether or not the difference is larger than a predetermined threshold value, and raising flags for the neighbouring signal and a neighbouring signal which are arranged symmetrically with respect to the signal of attention, when the difference is judged to be larger than the predetermined threshold value; and a control step of controlling and causing a process in the weighted average step to average by weight, using the signal of attention instead of the neighbouring signal for which the flag is raised.

A program in accordance with the present invention causes a computer to implement processes including: a designation step of designating continuously arranged signals as a signal of attention one by one; a determination step of determining a predetermined number of signals preceding the signal of attention designated by way of the designation step, and a predetermined number of signals following the signal of attention, to be neighbouring signals; a weight average step of averaging by weight the signal of attention and the plurality of neighbouring signals; a flag setting step of calculating a difference in levels between the signal of attention and a neighbouring signal, judging whether or not the difference is larger than a predetermined threshold value, and raising flags for the neighbouring signal and a neighbouring signal which are arranged symmetrically with respect to the signal of attention, when the difference is judged to be larger than the predetermined threshold value; and a control step of controlling and causing a process in the weighted average step to average by weight, using the signal of attention instead of the neighbouring signal for which the flag is raised.

In the signal processing apparatus and the method, and the program in accordance with the present invention, the difference in levels between the signal of attention and the neighbouring signal is calculated, and it is judged whether or not the difference is larger than the predetermined threshold value. When the difference is judged to be larger than the predetermined threshold value, flags are raised for the neighbouring signal and a neighbouring signal which are arranged symmetrically with respect to the signal of attention. In the case of averaging by weight the signal of attention and the plurality of neighbouring signals, the signal of attention is used instead of the neighbouring signals for which the flags are raised.

BRIEF DESCRIPTION OF THE DRAWINGS

FIG. 2A is a graph showing an image signal inputted into and an image signal outputted from an $\epsilon$ filter of FIG. 1;

FIG. 2B is a graph showing an image signal inputted into and an image signal outputted from the $\epsilon$ filter of FIG. 1;

FIG. 3 is a diagram showing an example of taps used for the $\epsilon$ filter of FIG. 1;

BEST MODE FOR CARRYING OUT THE INVENTION

Figure 1:
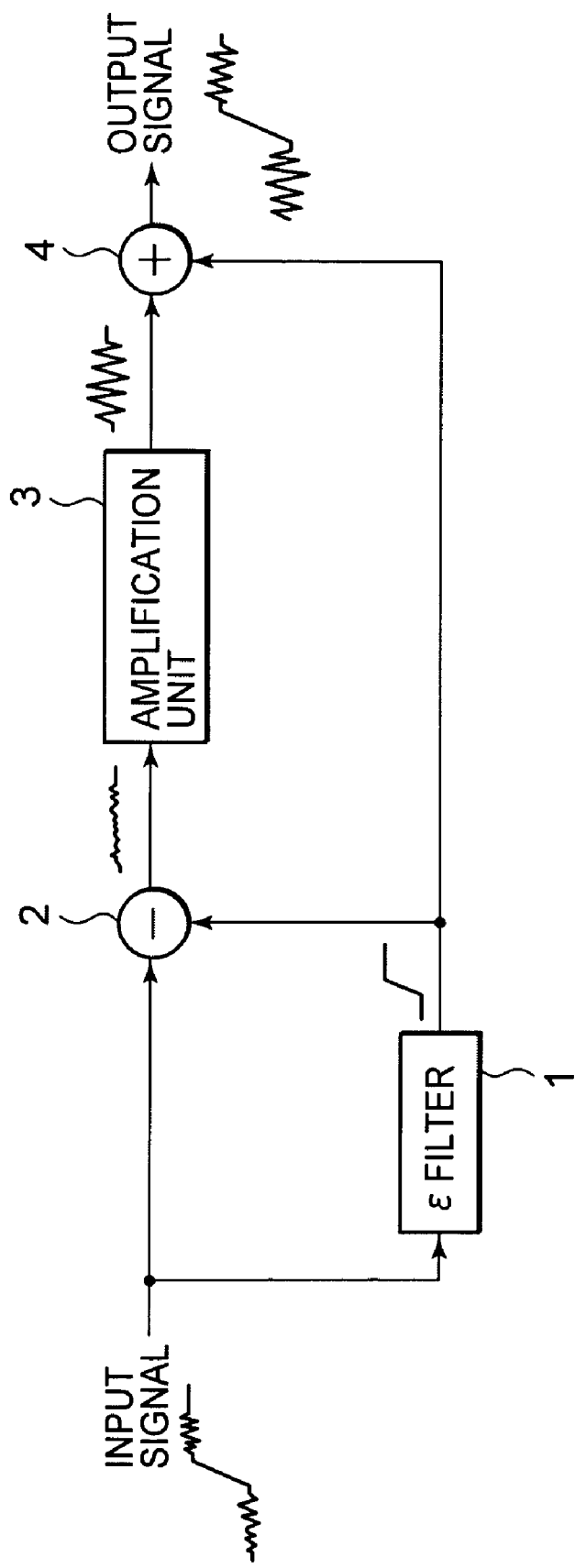
FIG. 1 is a block diagram showing an example of a structure of an image signal processing apparatus which emphasizes portions except an edge while a steep edge in an image is saved.
Figure 4:
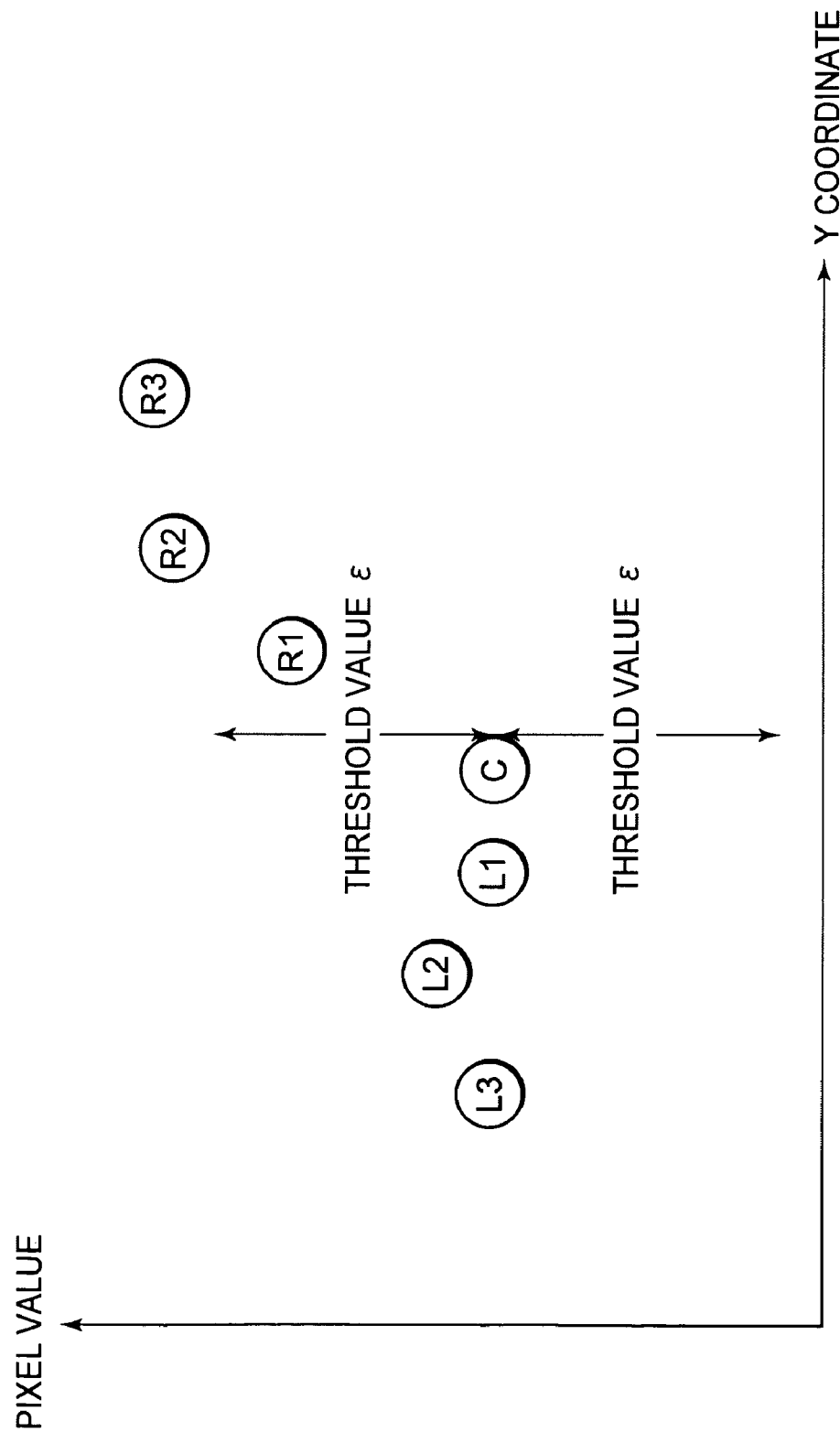
FIG. 4 is a chart for explaining operation of the $\epsilon$ filter of FIG. 1.

FIG. 3 shows an example of a structure of a nonlinear filter which is an embodiment of the present invention. This nonlinear filter 11 is used by replacing the $\epsilon$ filter 1 of the image signal processing apparatus as shown in FIG. 1, and it is constituted by a control signal generating unit 12 which generates a control signal based on an inputted image signal, and an LPF (Low Pass Filter) 13 which performs a filtering operation according to a control signal generated by the control signal generating unit 12.

Figure 8:
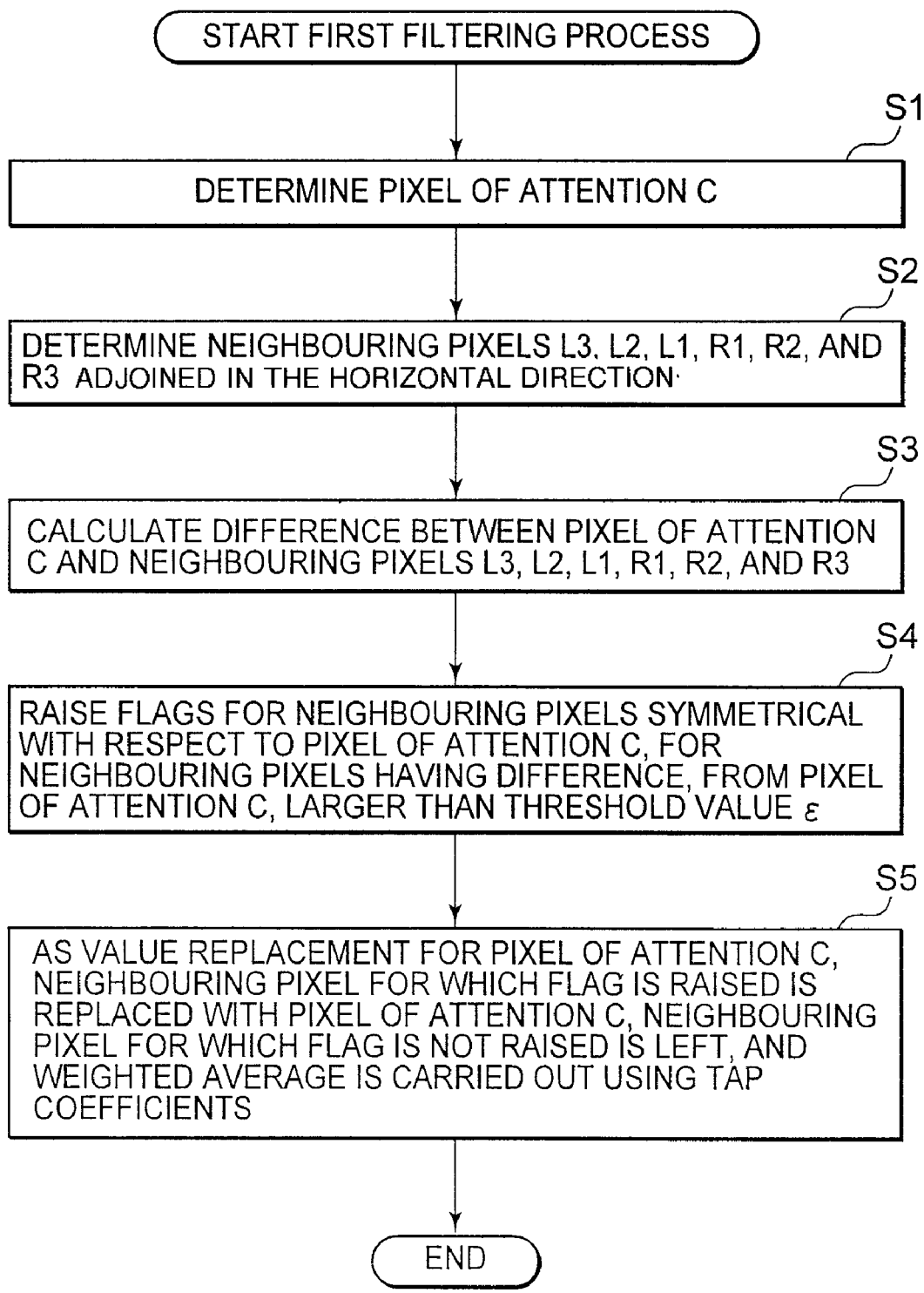
FIG. 8 is a flow chart for explaining a first filtering process by means of the nonlinear filter of FIG. 7.

A first filtering process by means of the nonlinear filter 11 will be described with reference to a flow chart of FIG. 8, referring to a case where 7-pixel taps, containing the pixel of attention C as shown in FIG. 3, are used as an example.

In step S1, the control signal generating unit 12 determines each of pixels in order of raster which constitute the inputted image signal, to be the pixel of attention C one by one. In step S2, the control signal generating unit 12 determines the neighbouring pixels L3, L2, L1, R1, R2, and R3 which adjoin in the horizontal direction with respect to the pixel of attention C. In step S3, the control signal generating unit 12 calculates a difference in pixel values between the pixel of attention C and each of the neighbouring pixels L3, L2, L1, R1, R2, and R3.

In step S4, the control signal generating unit 12 judges whether or not the difference calculated by way of the process in step S3 is larger than the predetermined threshold value $\epsilon$. Flags are raised for the neighbouring pixel judged to have the difference larger than the predetermined threshold value $\epsilon$, and a neighbouring pixel which are arranged symmetrically with respect to the pixel of attention C.

For example, when it is judged that the difference in pixel values between the pixel of attention C and the neighbouring pixel L1 is larger than the predetermined threshold value $\epsilon$, flags are raised for the neighbouring pixels L1 and R1. Similarly, when it is judged that the difference in pixel values between the pixel of attention C and the neighbouring pixel R2 is larger than the predetermined threshold value $\epsilon$, flags are raised for the neighbouring pixels R2 and L2.

Furthermore, in step S4, the control signal generating unit 12 outputs a signal indicative of whether or not there is a flag for the neighbouring pixels L3, L2, L1, R1, R2, and R3, to the LPF 13 as a control signal.

In step S5, the LPF 13 averages by weight the pixel of attention C and the neighbouring pixels L3, L2, L1, R1, R2, and R3 by using expression (1), to be outputted as the conversion result C' corresponding to the pixel of attention C. However, with respect to the neighbouring pixel for which the flag is raised, the pixel value is replaced by that of the pixel of attention C, and is calculated.

For example, when the flags are raised for the neighbouring pixels L2 and R2, the following expression (3) is operated.

$$C'=(1 \cdot L3+2 \cdot C+3 \cdot L1+4 \cdot C+3 \cdot R1+2 \cdot C+1 \cdot R3)/16 \quad (3)$$

Figure 5:
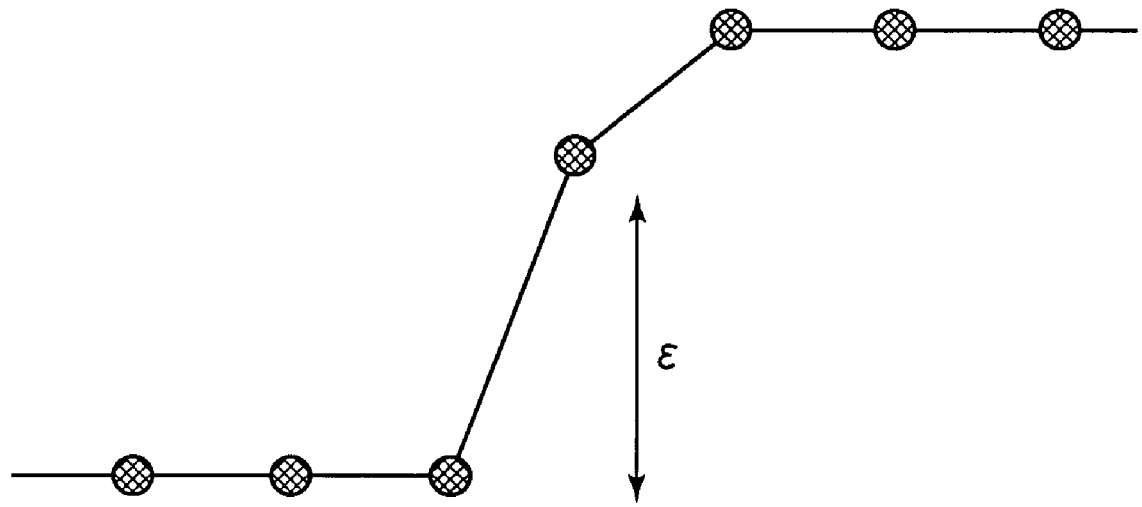
FIG. 5 is a chart showing an example of the image signal inputted into the $\epsilon$ filter.
Figure 6:
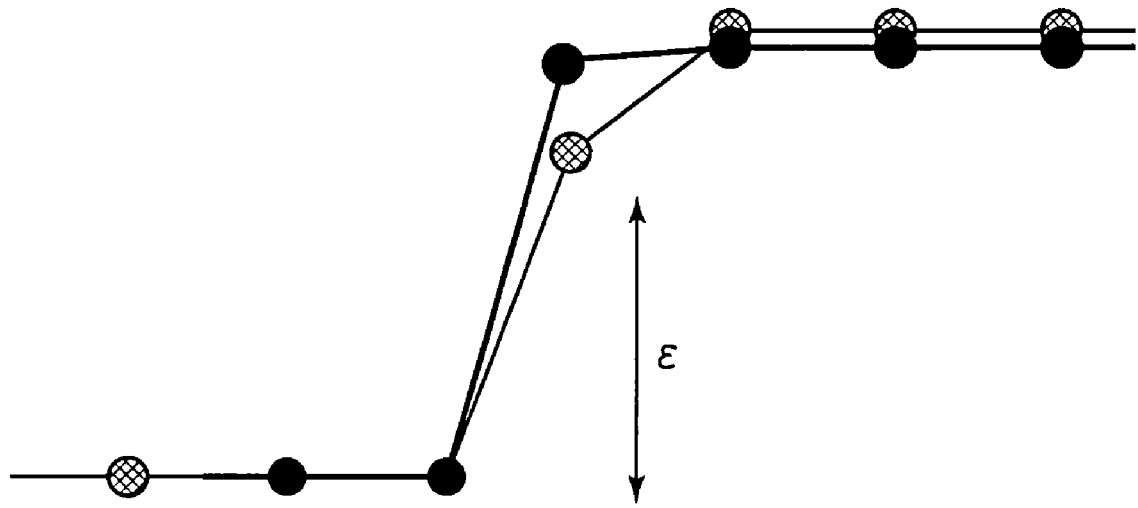
FIG. 6 is a chart showing an example of the image signal outputted from the $\epsilon$ filter, corresponding to the image signal as shown in FIG. 5.
Figure 7:
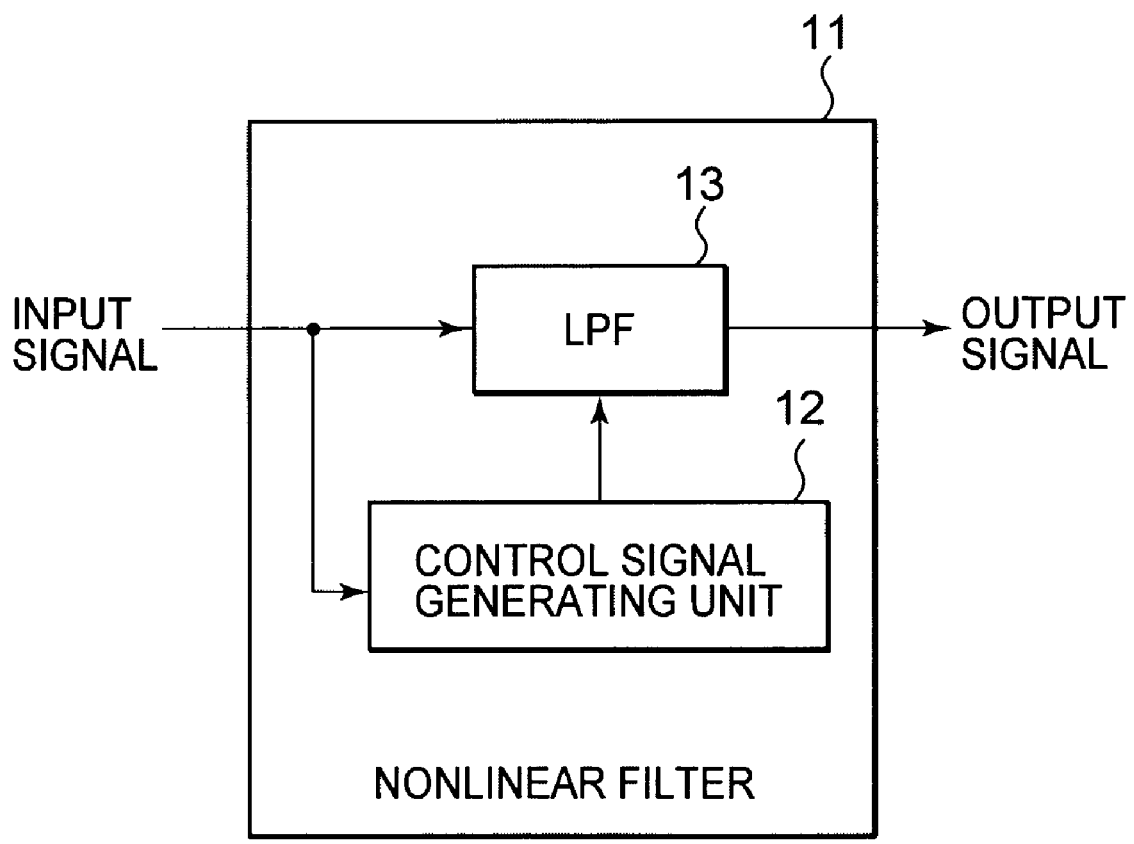
FIG. 7 is a block diagram showing an example of a structure of a nonlinear filter to which the present invention is applied.
Figure 9:
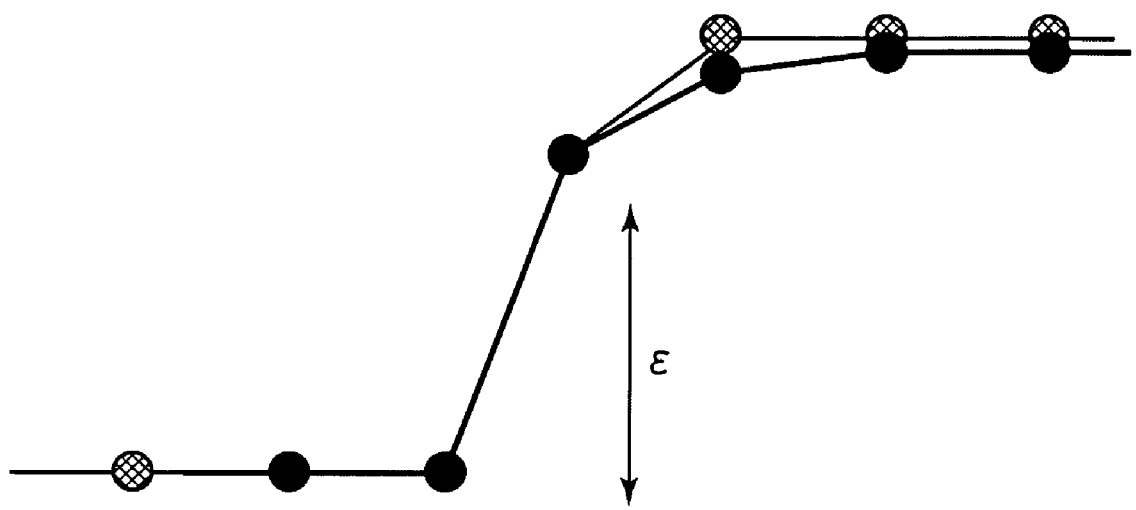
FIG. 9 is a chart showing the image signal acquired by way of the first filtering process with the nonlinear filter, corresponding to the image signal as shown in FIG. 5.

Now, the description of the first filtering process is completed. According to this first filtering process, as shown in FIG. 5, for example, when the image signal with the edge larger in size than the predetermined threshold value $\epsilon$ is inputted, the image signal after conversion is, as shown in FIG. 9, not shifted in phase and the edge with the steep change in pixel value is held correctly.

Figure 10:
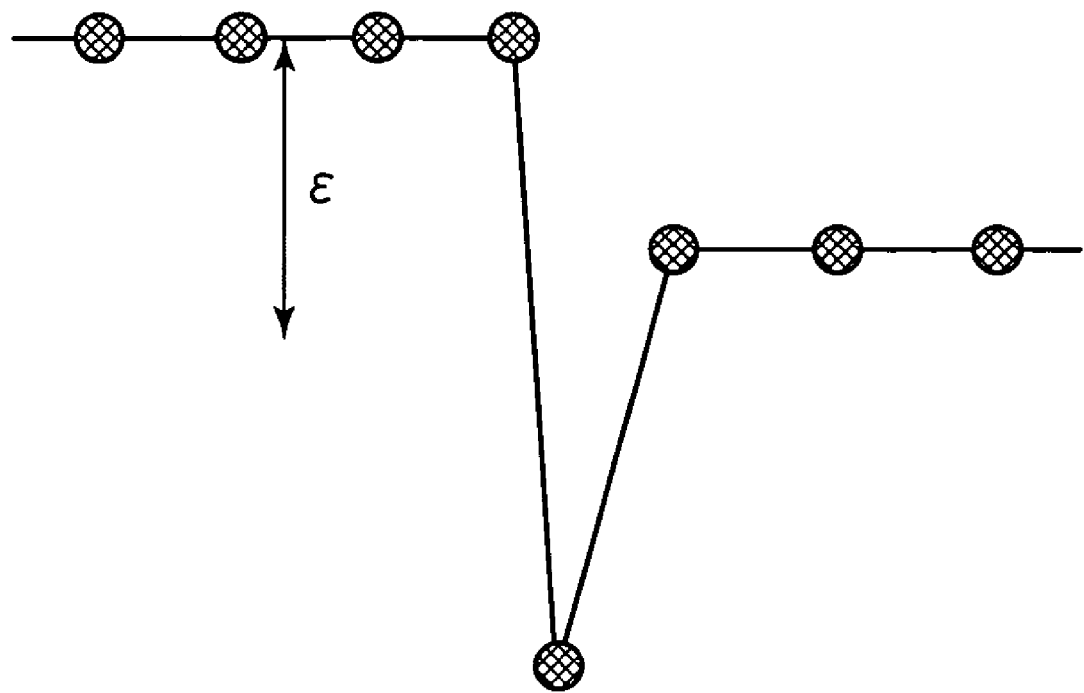
FIG. 10 is a chart showing an example of the image signal inputted into the nonlinear filter.
Figure 11:
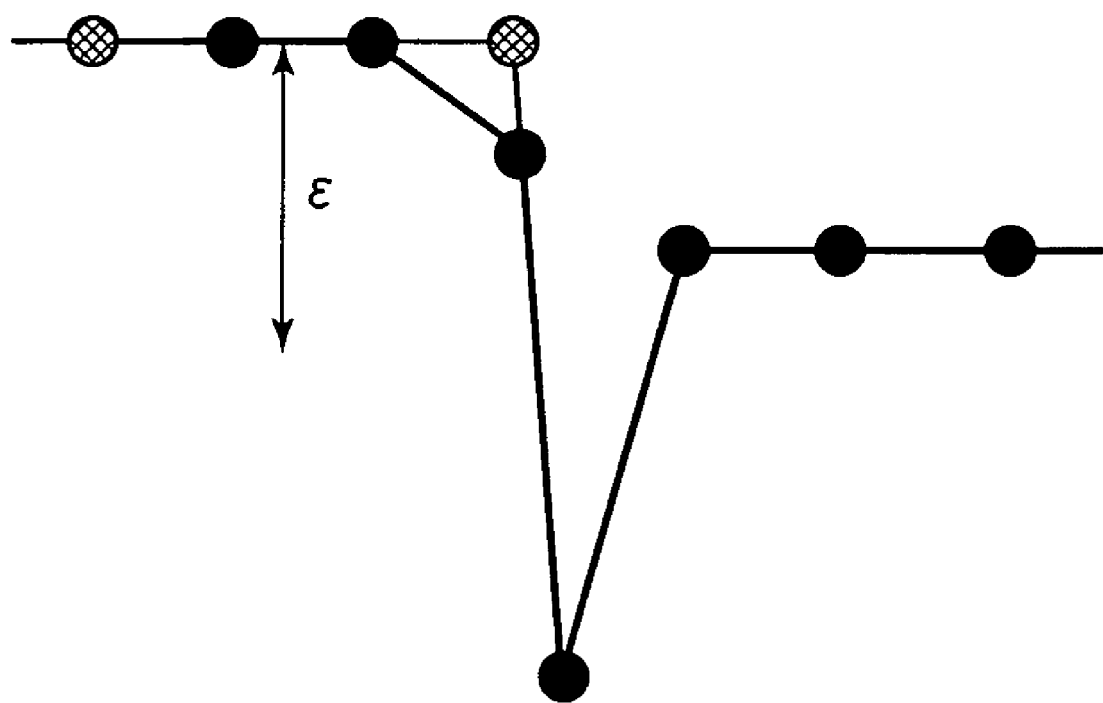
FIG. 11 is a chart showing an image signal acquired by way of the first filtering process with the nonlinear filter, corresponding to the image signal as shown in FIG. 10.

However, as shown in FIG. 10, for example, when an image signal with the edge larger in size than the predetermined threshold value $\epsilon$ is inputted, the edge with the steep change in pixel value, with respect to the image signal after conversion, may not be held correctly even by way of the first filtering process, as shown in FIG. 11.

Figure 12:
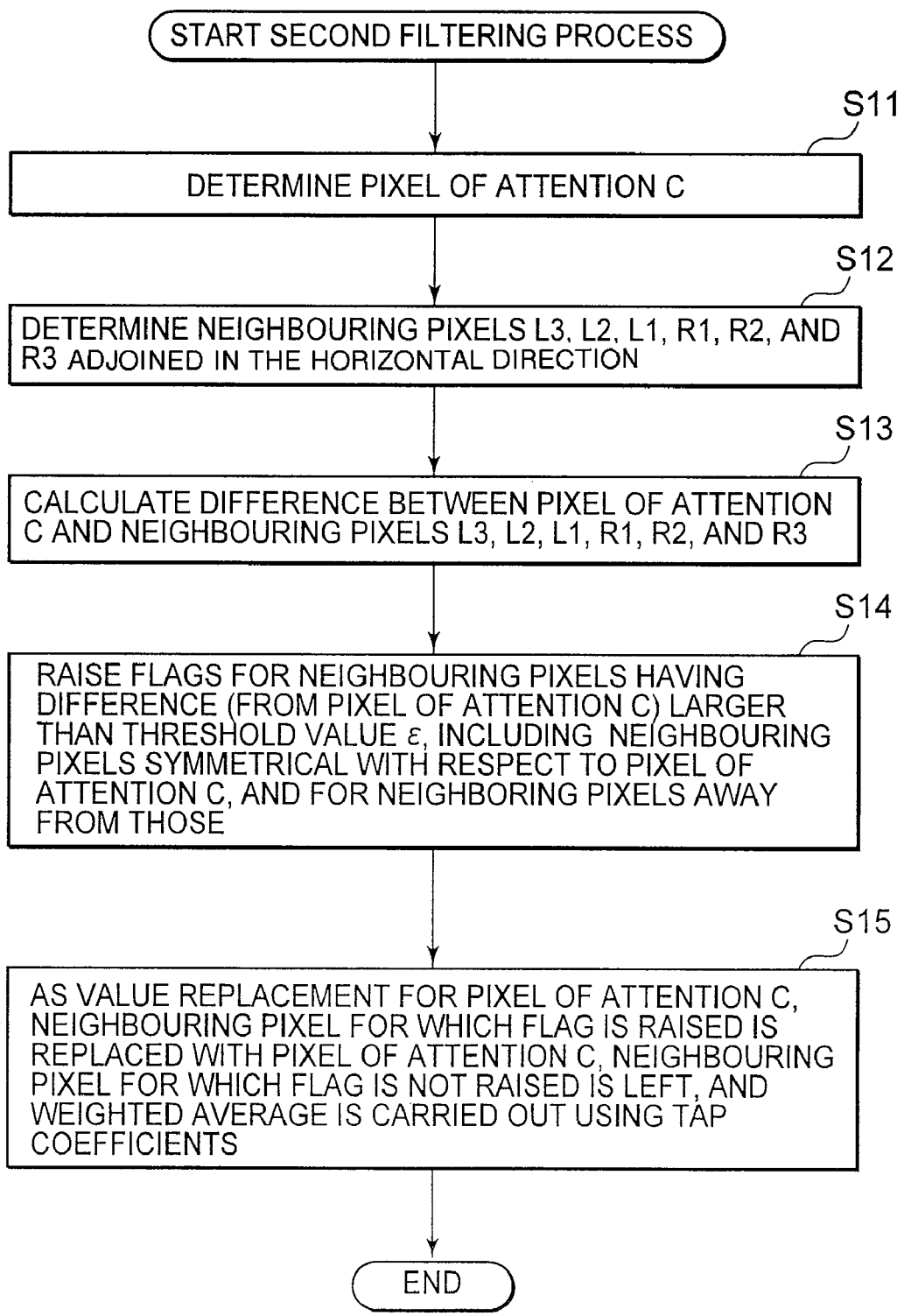
FIG. 12 is a flow chart for explaining a second filtering process by means of the nonlinear filter of FIG. 7.

Then, the nonlinear filter 11 is arranged to perform a second filtering process as will be described below. The second filtering process will be described with reference to a flow chart of FIG. 12, referring to a case where the 7-pixel taps, containing the pixel of attention C as shown in FIG. 3, are used as an example.

In step S11, the control signal generating unit 12 determines each of the pixels in order of raster which constitute the inputted image signal to be the pixel of attention C one by one. In step S12, the control signal generating unit 12 determines the neighbouring pixels L3, L2, L1, R1, R2, and R3 which adjoin in the horizontal direction with respect to the pixel of attention C. In step S13, the control signal generating unit 12 calculates a difference in pixel values between the pixel of attention C and each of the neighbouring pixels L3, L2, L1, R1, R2, and R3.

In step S14, the control signal generating unit 12 judges whether or not the difference calculated by way of the process in step S13 is larger than the predetermined threshold value $\epsilon$. Flags are raised for the neighbouring pixel judged to have the difference larger than the predetermined threshold value $\epsilon$, and a neighbouring pixel, which are arranged symmetrically with respect to the pixel of attention C. Furthermore, the control signal generating unit 12 also raises a flag for a neighbouring pixel away, in view of the pixel of attention C, from the right and left neighbouring pixels which are symmetrical with respect to the pixel of attention C.

For example, when it is judged that the difference in pixel values between the pixel of attention C and the neighbouring pixel L2 is larger than the predetermined threshold value $\epsilon$, flags are raised for the neighbouring pixels L2 and R2. Furthermore, flags are also raised for the neighbouring pixels L3 and R3 which are away from the neighbouring pixels L2 and R2 in view of the pixel of attention C.

Furthermore, in step S14, the control signal generating unit 12 outputs a signal indicative of whether or not there is a flag for the neighbouring pixels L3, L2, L1, R1, R2, and R3, to the LPF 13 as a control signal.

In step S15, the LPF 13 averages by weight the pixel of attention C and the neighbouring pixels L3, L2, L1, R1, R2, and R3 by using expression (1), to be outputted as the conversion result C' corresponding to the pixel of attention C. However, with respect to the neighbouring pixel for which the flag is raised, the pixel value is replaced by that of the pixel of attention C, and is calculated.

For example, when the flags are raised for the neighbouring pixels L3, L2, R2, and R3 the following expression (4) is operated.

$$C'=(1 \cdot C+2 \cdot C+3 \cdot L1+4 \cdot C+3 \cdot R1+2 \cdot C+1 \cdot C)/16 \quad (4)$$

Now, the description of the second filtering process is completed. Also according to this second filtering process, as shown in FIG. 5, for example, when the image signal with the edge larger in size than the predetermined threshold value $\epsilon$ is inputted, the image signal after conversion is not shifted in phase as shown in FIG. 9, and the edge with the steep change in pixel value is held correctly.

Figure 13:
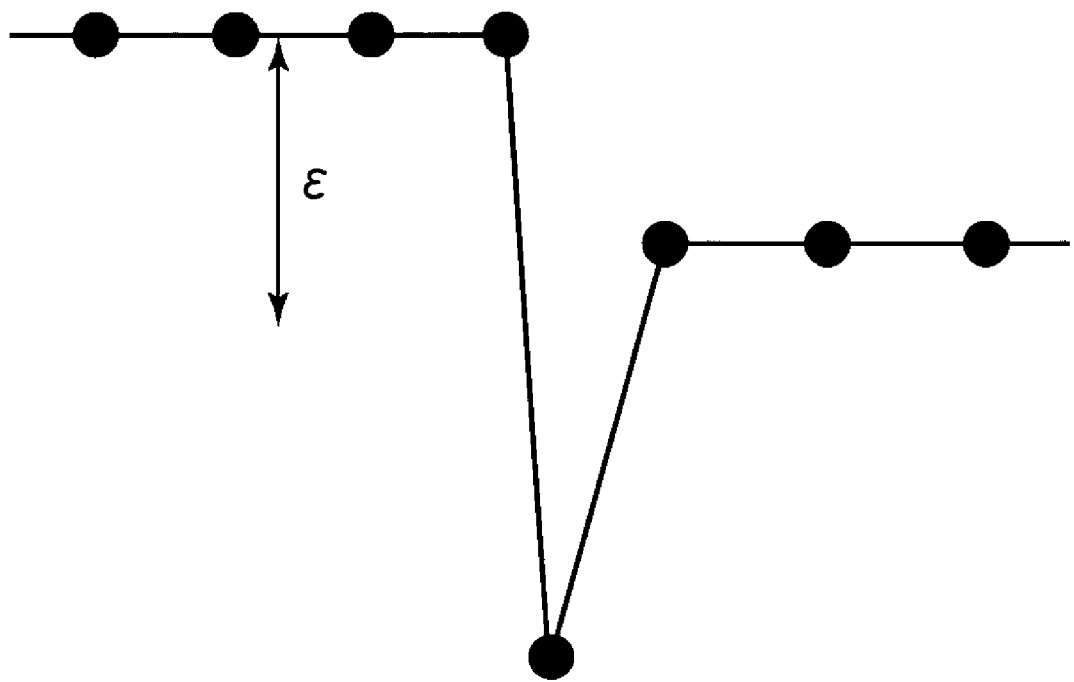
FIG. 13 is a chart showing an image signal acquired by the second filtering process with the nonlinear filter, corresponding to the image signal as shown in FIG. 10.

Further, for example, as shown in FIG. 10, even when the image signal with the edge larger in size than the predetermined threshold value $\epsilon$ is inputted, the image signal after conversion is not shifted in phase as shown in FIG. 13, and the edge with the steep change in pixel value is held correctly.

In addition, the present invention can be applied to any device handling an image signal, such as a video camera, a digital still camera, a printer, a display, a computer, etc.

For example, when it is applied to a computer which performs image processing, a high-definition contrast correction image can be obtained maintaining a dynamic range in case of correcting the image contrast. When the images obtained under different lighting conditions are composed, only the difference of each contrast component can be corrected and a natural composite image can be generated.

Figure 14:
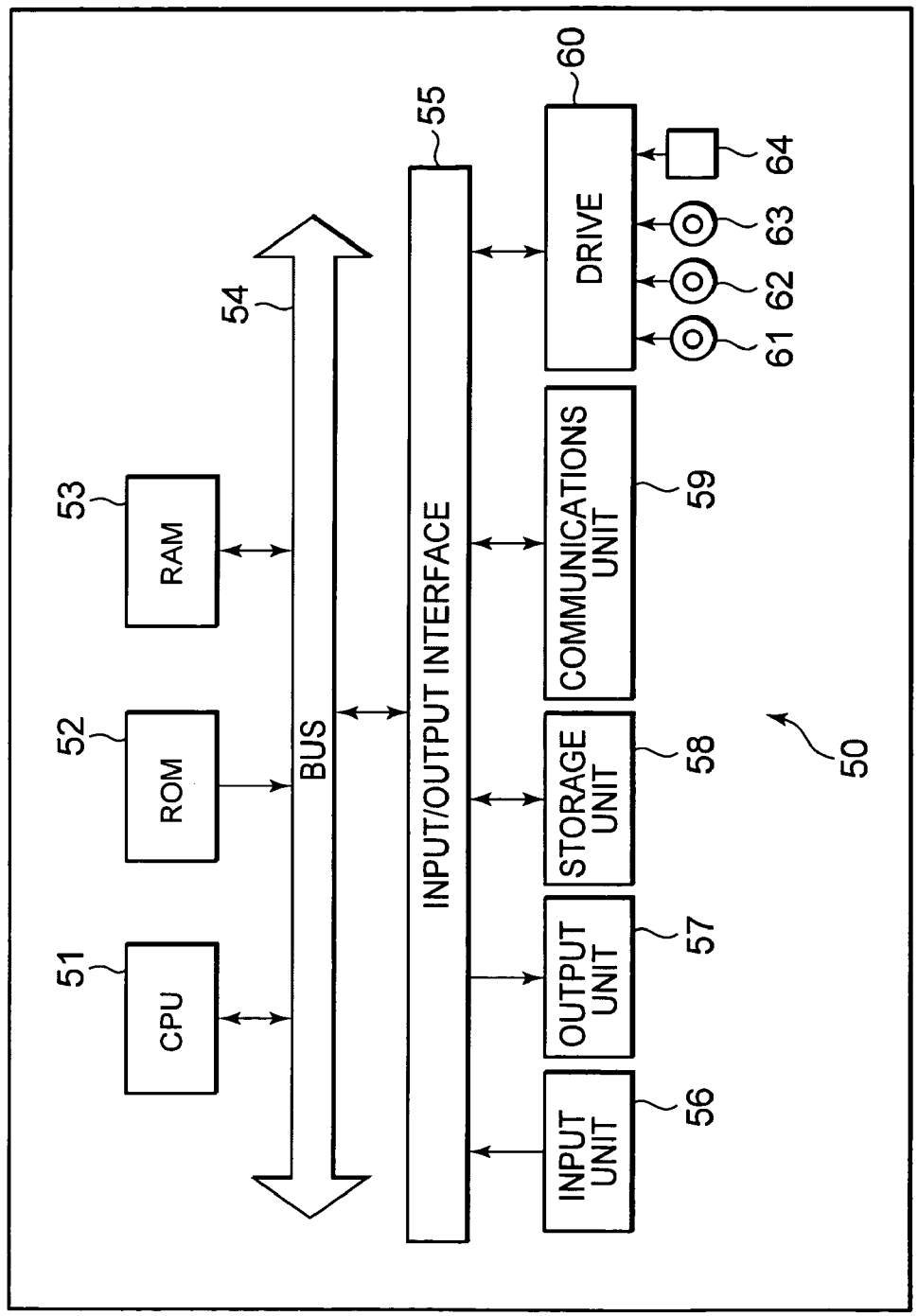
FIG. 14 is a block diagram showing an example of a structure of a general-purpose personal computer.

Incidentally, although a series of processes as mentioned above can be performed by means of hardware, they can also be performed by way of software. When performing the series of processes by way of software, a program constituting the software is installed from a recording medium in a computer which is built into dedicated hardware, or a general-purpose personal computer which has various types of programs installed therein and is capable of performing various types of functions as shown in FIG. 14, for example.

This personal computer 50 contains a CPU (Central Processing Unit) 51 therein. The CPU 51 is connected through a bus 54 to an input/output interface 55. The bus 54 is connected with a ROM (Read Only Memory) 52 and a RAM (Random Access Memory) 53.

The input/output interface 55 is connected with an input unit 56 made of an input device, such as a keyboard, a mouse, a remote controller, etc. through which a user inputs an operation command, an output unit 57 for outputting a composite picture signal to a display, a storage unit 58 made of a hard disk drive etc. for storing a program and various data, and a communications unit 59 made of a modem, a LAN (Local Area Network) adapter, etc., for performing a communications process through a network represented by the Internet. Further, it is connected with a drive 60 for reading/writing data from/to a recording media, such as a magnetic disk 61 (including a flexible disk), an optical disc 62 (including a CD-ROM (Compact Disc-Read Only Memory) and a DVD (Digital Versatile Disc)), a magneto-optical disc 63 (including an MD (Mini Disc)), a semiconductor memory 64, etc.

The program which causes the CPU 51 to carry out the above-mentioned first or second filtering process is supplied to the personal computer in the situation where it is stored in the magnetic disk 61 through the semiconductor memory 64, and it is read by the drive 60 and installed in the hard disk drive which is built in the storage unit 58. Alternatively, it is envisaged that it may be supplied through the network. The program installed in the storage unit 58 is loaded from the storage unit 58 to the RAM 53 according to instructions from the CPU 51 corresponding to the command, from the user, inputted into the input unit 56, and is executed.

In addition, in the present specification, steps which describe each flowchart include processes performed in chronological order according to the description but also processes carried out in parallel or individually, even if they are not necessarily processed in chronological order.

INDUSTRIAL APPLICABILITY

As described above, according to the present invention, the portions except the edge can be smoothed while the edge whose change in pixel value is steep is held correctly.

The invention claimed is:

1. A signal processing apparatus for adjusting levels of continuously arranged signals, said signal processing apparatus comprising:
   a designation unit for designating the continuously arranged signals as a signal of attention one by one;
   a determination unit for determining a predetermined number of signals preceding the signal of attention designated by the designation unit and a predetermined number of signals following the signal of attention, to be predetermined neighbouring signals;
   a weight average unit for averaging by weight the signal of attention and the predetermined neighbouring signals;
   flag setting unit for calculating a difference in levels between the signal of attention and a neighbouring signal, judging whether or not the difference is larger than a predetermined threshold value, and raising flags for the neighbouring signal and another neighbouring signal, the two neighbouring signals arranged symmetrically with respect to the signal of attention, when the difference is judged to be larger than the predetermined threshold value; and
   a control unit for controlling and causing the weighted average unit to average by weight the signal of attention and the predetermined neighbouring signals, using the level of the signal of attention instead of the level of each of the neighbouring signals for which flags are raised.

2. The signal processing apparatus as described in claim 1, wherein said flag setting unit further raises a flag for a neighboring pixel away, in view of the pixel of attention, from the two neighboring pixels raised with flags.

3. The signal processing apparatus as described in claim 1, wherein said signals are pixel values of pixels constituting an image.

4. A computer readable medium storing a program for adjusting levels of continuously arranged signals, said program comprising:
   a designation step of designating continuously arranged signals as a signal of attention one by one;
   a determination step of determining a predetermined number of signals preceding the signal of attention designated by way of the designation step, and a predetermined number of signals following the signal of attention, to be predetermined neighbouring signals;
   a weight average step of averaging by weight the signal of attention and the predetermined of neighbouring signals;
   a flag setting step of calculating a difference in levels between the signal of attention and a neighbouring signal, judging whether or not the difference is larger than a predetermined threshold value, and raising flags for the neighbouring signal and a another neighbouring signal, the two neighbouring signals are arranged symmetrically with respect to the signal of attention, when the difference is judged to be larger than the predetermined threshold value; and
   a control step of controlling and causing a process in the weighted average step to average by weight the signal of attention and the predetermined neighbouring signals, using the level of the signal of attention instead of the level of each of the neighbouring signals for which flags are raised.

* * * * *